(12) United States Patent
Mizutani et al.

(10) Patent No.: US 6,367,893 B1
(45) Date of Patent: Apr. 9, 2002

(54) BRAKE BOOSTER PRESSURE CONTROL APPARATUS

(75) Inventors: Yasuji Mizutani, Susono; Hiroyuki Mizuno, Toyota; Yoshihisa Yamada, Sunto-gun; Shirou Monzaki, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/516,631

(22) Filed: Mar. 1, 2000

(30) Foreign Application Priority Data

Mar. 12, 1999 (JP) .............................. 11-067361

(51) Int. Cl.[7] .............................. B60T 8/32; B60T 8/60; B60T 13/00
(52) U.S. Cl. .................... 303/191; 303/113.1; 303/155; 60/547.1; 60/545
(58) Field of Search .............................. 303/191, 113.4, 303/155; 60/547.1, 545

(56) References Cited

U.S. PATENT DOCUMENTS

| 3,947,073 A | 3/1976 | Cattaneo et al. |
| 5,091,857 A | 2/1992 | Katayama et al. |
| 5,676,101 A | 10/1997 | Kawai et al. |
| 5,826,559 A | 10/1998 | Ichimoto et al. |
| 5,846,164 A | 12/1998 | Harada |

FOREIGN PATENT DOCUMENTS

| JP | 8-164840 | 6/1996 |
| JP | 10-167047 | 6/1998 |

*Primary Examiner*—Joseph D. Pape
*Assistant Examiner*—Hilary Gutman
(74) *Attorney, Agent, or Firm*—Oliff & Berridge PLC (57) ABSTRACT

A brake booster pressure control apparatus is provided for controlling the vacuum pressure of a brake booster, the brake booster assisting a braking operation on a brake pedal by using an intake air pressure. The brake booster pressure control apparatus includes a brake-pedal vibration detecting unit that outputs a signal indicative of occurrence of vibrations of the brake pedal. A pressure control unit controls the pressure of the brake booster based on the signal output by the brake-pedal vibration detecting unit.

10 Claims, 4 Drawing Sheets

BRAKE BOOSTER PRESSURE CONTROL APPARATUS

The invention is based on Japanese Priority Application No. 11-067361, filed Mar. 12, 1999, the entire contents of which are hereby incorporated by reference.

BACKGROUND OF THE INVENTION

1. Field of the Invention

The present invention generally relates to a brake booster pressure control apparatus, and more particularly to a brake booster pressure control apparatus that is appropriate to control the vacuum pressure of a brake booster, which assists a braking operation on a brake pedal by utilizing the vacuum pressure of intake air supplied from an intake pipe of an internal combustion engine to the brake booster.

2. Description of the Related Art

As disclosed in Japanese Laid-Open Patent Application No. 10-167047, a brake booster pressure control apparatus is known. The brake booster pressure control apparatus controls the vacuum pressure of a brake booster that acts on a brake master cylinder, in addition to a pedal depressing force exerted by the vehicle operator on a brake pedal and transmitted to the brake master cylinder. The brake booster produces a braking force that assists the braking operation by the vehicle operator to depress the brake pedal in the vehicle. The pressure of the brake booster can increase the depressing force of the vehicle operator on the brake pedal, which is transmitted to the brake master cylinder. In order to produce an adequate vacuum pressure, the brake booster of a certain type utilizes intake air pressure supplied from an intake pipe of an internal combustion engine to the brake booster.

The brake booster pressure control apparatus of the above-mentioned publication is applicable to a direct injection engine. In the direct injection engine, a fuel injection valve is provided in the combustion chamber of the engine, and the fuel injection valve injects fuel directly into the combustion chamber. For example, during a low-load operation of the direct injection engine, the throttle valve in the intake pipe is set in a valve-open position even when the vehicle operator does not depress the accelerator pedal, and a large amount of intake air can be supplied to the combustion chamber. This allows the direct injection engine to achieve a stratified charge combustion (SCC), which makes it possible to improve the fuel economy during the low-load operation of the engine.

In the case of the direct injection engine, the pressure of intake air in the intake pipe may be lowered when the throttle valve is set in the valve-open position regardless of whether or not the vehicle operator depresses the accelerator pedal. With the lowered level of the intake air pressure, it is difficult to obtain an adequate level of the vacuum pressure through the input pipe to the brake booster. The pressure of the brake booster may become insufficient to assist the braking operation. To eliminate this problem, the brake booster pressure control apparatus of the above publication starts execution of a pressure control routine in which the valve-open position of the throttle valve is adjusted in a direction to raise the intake air pressure, if a detected pressure of the brake booster exceeds a pressure-control starting pressure.

However, in the case of the above-mentioned brake booster pressure control apparatus, if the valve-open position of the throttle valve is changed to a smaller valve-open position, the driving force output by the engine is lowered, and this causes a fluctuation of the engine torque. Moreover, in such a condition, the combustion state of the engine is transferred from the SCC mode to a stoichiometric combustion (SMC) mode, and this causes the fuel economy to be worsened. In order to eliminate such problems, the above-mentioned brake booster pressure control apparatus varies the pressure-control starting pressure in response to a detected vehicle speed.

As described above, the execution of the pressure control routine is started by the above-mentioned brake booster pressure control apparatus if the detected brake booster pressure exceeds the pressure-control starting pressure. As the pressure-control starting pressure is varied in response to the detected vehicle speed, the execution of the pressure control routine can be started at a time that is suitable to prevent the fluctuation of the engine torque or the worsening of the fuel economy.

Generally, when an ABS (antilock brake system) control is executed, repetitive fluctuations of the pressure of brake fluid in the brake system take place, and such hydraulic pressure fluctuations cause movements of the brake pedal. Hereinafter, such movements of the brake pedal will be called the brake pedal vibrations. The pressure of the brake booster is mostly consumed when the stroke of the brake pedal changes considerably. When the brake pedal vibrations take place, the energy consumption of the brake booster will be increased. In other words, the energy consumption of the brake booster when the ABS control is executed is larger than that of the brake booster when a normal braking operation is executed.

However, the above-mentioned brake booster pressure control apparatus does not take account of the increased energy consumption, such as with the execution of the ABS control, although it executes the pressure control routine or varies the pressure-control starting pressure as described above. It is difficult for the above brake booster pressure control apparatus to maintain adequate brake booster pressure for the energy consumption of the brake booster, which is increased during the execution of the ABS control or upon occurrence of the brake pedal vibrations.

SUMMARY OF THE INVENTION

In order to overcome the problems described above, preferred embodiments of the present invention provide an improved brake booster pressure control apparatus that effectively maintains adequate brake booster pressure for the energy consumption that is increased when the brake pedal vibrations take place.

According to one preferred embodiment of the present invention, a brake booster pressure control apparatus, which is provided for controlling the pressure of a brake booster, the brake booster assisting a braking operation on a brake pedal by using an intake air pressure, the brake booster pressure control apparatus including: a brake-pedal vibration detecting unit which outputs a signal indicating the occurrence of vibrations of the brake pedal; and a pressure control unit which controls the pressure of the brake booster based on the signal output by the brake-pedal vibration detecting unit.

In the brake booster pressure control apparatus of the preferred embodiment, the brake-pedal vibration detecting unit outputs the signal indicating the occurrence of the brake pedal vibrations, and the pressure control unit controls the brake booster pressure based on the signal output by the brake-pedal vibration detecting unit. The brake booster pressure control apparatus of the present invention is effective in providing adequate brake booster pressure for the energy consumption that is increased when the brake pedal vibrations take place.

BRIEF DESCRIPTION OF THE DRAWINGS

Other objects, features and advantages of the present invention will become apparent from the following detailed description when read in conjunction with the accompanying drawings in which.

DETAILED DESCRIPTION OF PREFERRED EMBODIMENTS

A description will now be provided of preferred embodiments of the present invention with reference to the accompanying drawings.

Figure 1:
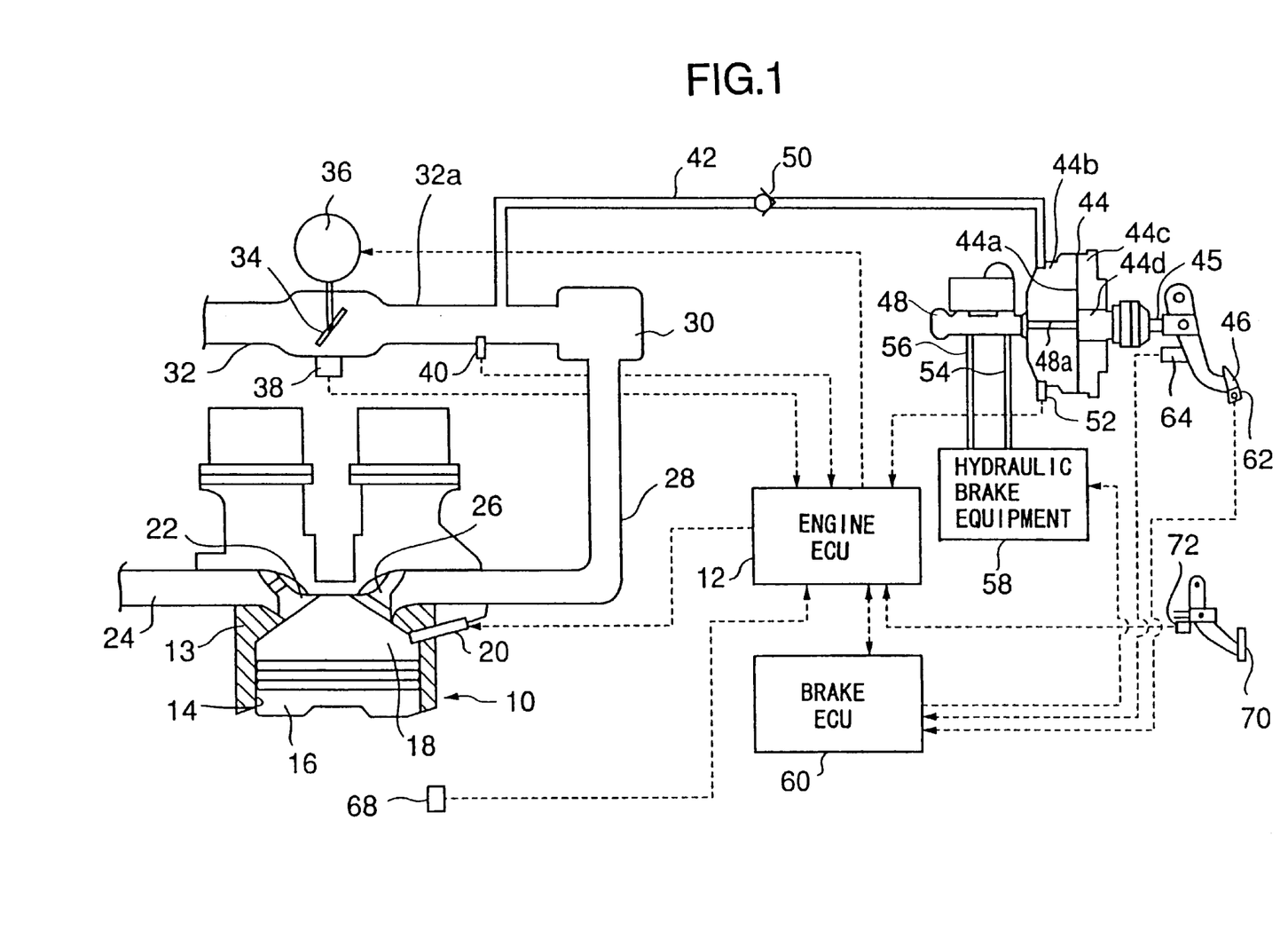
FIG. 1 is a diagram showing a brake system to which one preferred embodiment of the brake booster pressure control apparatus of the invention is applied.

FIG. 1 shows a brake system to which one preferred embodiment of the present invention is applied.

As shown in FIG. 1, the brake system in the present embodiment is connected to an internal combustion engine 10. An engine ECU (electronic control unit) 12 controls operations of the engine 10. The engine 10 is provided with a cylinder block 13. The cylinder block 13 includes a plurality of cylinders provided therein. In FIG. 1, reference numeral 14 denotes one of the plurality of cylinders provided in the engine 10. For the sake of convenience, only one cylinder 14 of the engine 10 is illustrated in FIG. 1.

In the engine 10 of FIG. 1, a piston 16 is provided in the cylinder 14, and the piston 16 moves up and down within the cylinder 14 during operation. A combustion chamber 18 is formed in the cylinder block 13 at a portion above the top of the piston 16. In the cylinder block 13 a fuel injection port is formed, and a fuel injection valve 20 is fitted to the fuel injection port so that the fuel injection valve 20 projects toward the inside of the combustion chamber 18. The fuel injection valve 20 is electrically connected to the engine ECU 12. The ECU 12 outputs a control signal to the fuel injection valve 20, and the fuel injection valve 20 injects fuel into the combustion chamber 18 in accordance with the control signal supplied from the ECU 12. The engine 10 in the present embodiment is configured into a structure of the direct injection engine that is previously described.

At an exhaust port of the combustion chamber 18 in the engine 10 of FIG. 1, an exhaust valve 22 is provided. An exhaust pipe 24 is connected to the combustion chamber 18 via the exhaust valve 22. At an inlet port of the combustion chamber 18, an intake valve 26 is provided. An intake manifold 28 has a downstream end portion connected to the combustion chamber 18 via the intake valve 26. The intake manifold 28 is connected at its upstream end to a surge tank 30. The surge tank 30 is connected at its upstream end to the intake pipe 32.

A throttle valve 34 is provided within the intake pipe 32 as shown in FIG. 1. A throttle motor 36 is provided outside the intake pipe 32, and the throttle motor 36 has a drive shaft connected to the throttle valve 34. The throttle motor 36 is electrically connected to the engine ECU 12. The throttle motor 36 is driven in accordance with a control signal supplied from the engine ECU 12. The throttle valve 34 is rotated by the throttle motor 36 through the drive shaft thereof, so that the throttle valve 34 is set to a target valve-opening position that is indicated by the control signal. Hence, the engine ECU 12 can control an amount of intake air, which is passed through the throttle valve 34 in the intake pipe 32 and enters the combustion chamber 18 of the engine 10 through the intake valve 26, by controlling the valve-opening position of the throttle valve 34 through the throttle motor 36.

A throttle position sensor 38 is provided on the intake pipe 32 in the vicinity of the throttle valve 34. The throttle position sensor 38 is electrically connected to the engine ECU 12. The throttle position sensor 38 outputs an electrical signal, indicative of a throttle opening angle (which will be called the throttle opening angle "SC") of the throttle valve 34, to the engine ECU 12. The engine ECU 12 detects the throttle opening angle SC of the throttle valve 34 based on the signal output by the throttle position sensor 38.

An intake pressure sensor 40 is provided on the intake pipe 32 at a downstream position (which is denoted by reference numeral 32a in FIG. 1) from the throttle valve 34. The intake pressure sensor 40 is electrically connected to the engine ECU 12. The intake pressure sensor 40 outputs an electrical signal, indicative of a vacuum pressure of intake air (which will be called the intake air pressure "PM") at the downstream position 32a in the intake pipe 32, to the engine ECU 12. The engine ECU 12 detects the intake air pressure PM of the intake pipe 32 based on the signal output by the intake pressure sensor 40.

A vacuum supply passage 42 is connected at one end to the intake pipe 32 in the vicinity of the downstream position 32a. The vacuum supply passage 42 is connected at the other end to a brake booster 44. The intake air pressure PM of the intake pipe 32 is supplied through the vacuum supply passage 42 to the brake booster 44.

As shown in FIG. 1, the brake booster 44 includes a diaphragm 44a provided therein. The internal space of the brake booster 44 is divided by the diaphragm 44a into a vacuum supply chamber 44b and a pressure control chamber 44c. The vacuum supply chamber 44b is provided on the left side of the diaphragm 44a, and the pressure control chamber 44c is provided on the right side of the diaphragm 44a, as shown in FIG. 1. The vacuum supply passage 42 described above is connected into the vacuum supply chamber 44b of the brake booster 44. The brake booster 44 further includes a servo mechanism 44d provided therein. A brake pedal 46 is mechanically connected through an operating rod 45 to the servo mechanism 44d of the brake booster 44. A brake master cylinder 48 is provided as the pressure source of the brake system in the present embodiment. The brake master cylinder 48 includes a push rod 48a, and this push rod 48a is connected through the diaphragm 44a to the servo mechanism 44d.

A check valve 50 is provided at an intermediate position of the vacuum supply 42. The check valve 50 is a one-way valve that allows the flow of the intake air within the vacuum supply passage 42 only in the direction from the brake booster 44 to the intake pipe 32. When the intake air pressure PM of the intake pipe 32 is less than the pressure of air (which will be called the brake booster pressure "PB") within the vacuum supply chamber 44b of the brake booster 44, the intake air pressure PM (or the vacuum pressure) is increased in the vacuum supply chamber 44b by air flowing through the check valve 50. Otherwise the check valve 50 serves to prevent the backward flow of the intake air. Hereinafter, the brake booster pressure PB in the brake booster 44, means a relative pressure that is measured from the atmospheric pressure and usually has a negative value. In other words, the brake booster pressure PB does not mean an absolute pressure that is measured from zero pressure.

A brake booster pressure sensor 52 is provided in the vacuum supply chamber 44b of the brake booster 44. The brake booster pressure sensor 52 is electrically connected to the engine ECU 12. The brake booster pressure 52 outputs an electrical signal, indicative of the brake booster pressure PB of the brake booster 44, to the engine ECU 12. The engine ECU 12 detects the brake booster pressure PB of the brake booster 44 based on the signal output by the brake booster pressure sensor 52.

When the vehicle operator does not depress the brake pedal 46, the servo mechanism 44d of the brake booster 44 serves to isolate the pressure control chamber 44c from the atmosphere and to connect the pressure control chamber 44c and the vacuum supply chamber 44b together.

On the other hand, when the vehicle operator depresses the brake pedal 46, the servo mechanism 44d serves to isolate the pressure control chamber 44c from the vacuum supply chamber 44b and to introduce the external air into the pressure control chamber 44c of the brake booster 44 in response to the vehicle operator's force (which will be called the brake pedal force "F") that is exerted on the brake pedal 46. The brake booster pressure PB of the brake booster 44 at this time acts on the brake master cylinder 48, in addition to the brake pedal force F, which is exerted by the vehicle operator on the brake pedal 46 and transmitted to the brake master cylinder 48. Hence, the brake booster 44 produces a braking force that assists the braking operation by the vehicle operator to depress the brake pedal 46.

As described above, when the vehicle operator depresses the brake pedal 46, the force generated by the brake booster pressure PB of the brake booster 44, combined with the brake pedal force F, is transmitted to the brake master cylinder 48 via the push rod 48a. The resulting pressure of the brake fluid, which is produced at this time in the brake master cylinder 48, is called the master cylinder pressure "Pmc". In the present embodiment, the master cylinder pressure Pmc of the brake master cylinder 48 is produced by the combined function of the force generated by the brake booster pressure PB of the brake booster 44 in addition to the vehicle operator's brake pedal force F on the brake pedal 46.

In the brake system of FIG. 1, hydraulic brake equipment 58 is connected to the brake master cylinder 48 through brake pipes 54 and 56. A brake ECU 60 controls operations of the hydraulic brake equipment 58. A description of the hydraulic brake equipment 58 will be given later.

Further, in the brake system of FIG. 1, a brake pedal pressure sensor 62 is mounted onto the brake pedal 46. The brake pedal pressure sensor 62 is electrically connected to the brake ECU 60. The brake pedal pressure sensor 62 outputs an electrical signal, indicative of the vehicle operator's brake pedal force F on the brake pedal 46, to the brake ECU 60. The brake ECU 60 detects the brake pedal force F on the brake pedal 46 based on the signal output by the brake pedal pressure sensor 62.

A brake pedal stroke sensor 64 is provided on the brake pedal 46 in the vicinity of the operating rod 45. The brake pedal stroke sensor 64 is electrically connected to the brake ECU 60. The brake pedal stroke sensor 64 outputs an electrical signal, indicative of the brake pedal stroke (which will be called the brake pedal stroke "ST") of the brake pedal 46, to the brake ECU 60. The brake ECU 60 detects the brake pedal stroke ST of the brake pedal 46 based on the signal output by the brake pedal stroke sensor 64.

Further, in the automotive vehicle in which the brake system of FIG. 1 is installed, an engine speed sensor 68 is provided in the engine 10. The engine speed sensor 68 is electrically connected to the engine ECU 12. The engine speed sensor 68 outputs a pulsed signal, indicative of the engine speed (which will be called the engine speed "Ne") of the engine 10, to the engine ECU 12. The engine ECU 12 detects the engine speed Ne based on the signal output by the engine speed sensor 68.

Further, in the automotive vehicle in which the brake system of FIG. 1 is installed, an accelerator position sensor 72 is mounted onto an accelerator pedal 70. The accelerator position sensor 72 is electrically connected to the engine ECU 12. The accelerator position sensor 72 outputs an electrical signal, indicative of an accelerator opening angle (which will be called the accelerator opening angle "AC") of the accelerator pedal 70, to the engine ECU 12. The engine ECU 12 detects the accelerator opening angle AC of the accelerator pedal 70 based on the signal output by the accelerator position sensor 72.

Next, a description will be given of the hydraulic brake equipment 58 in the brake system of the present embodiment.

Figure 2:
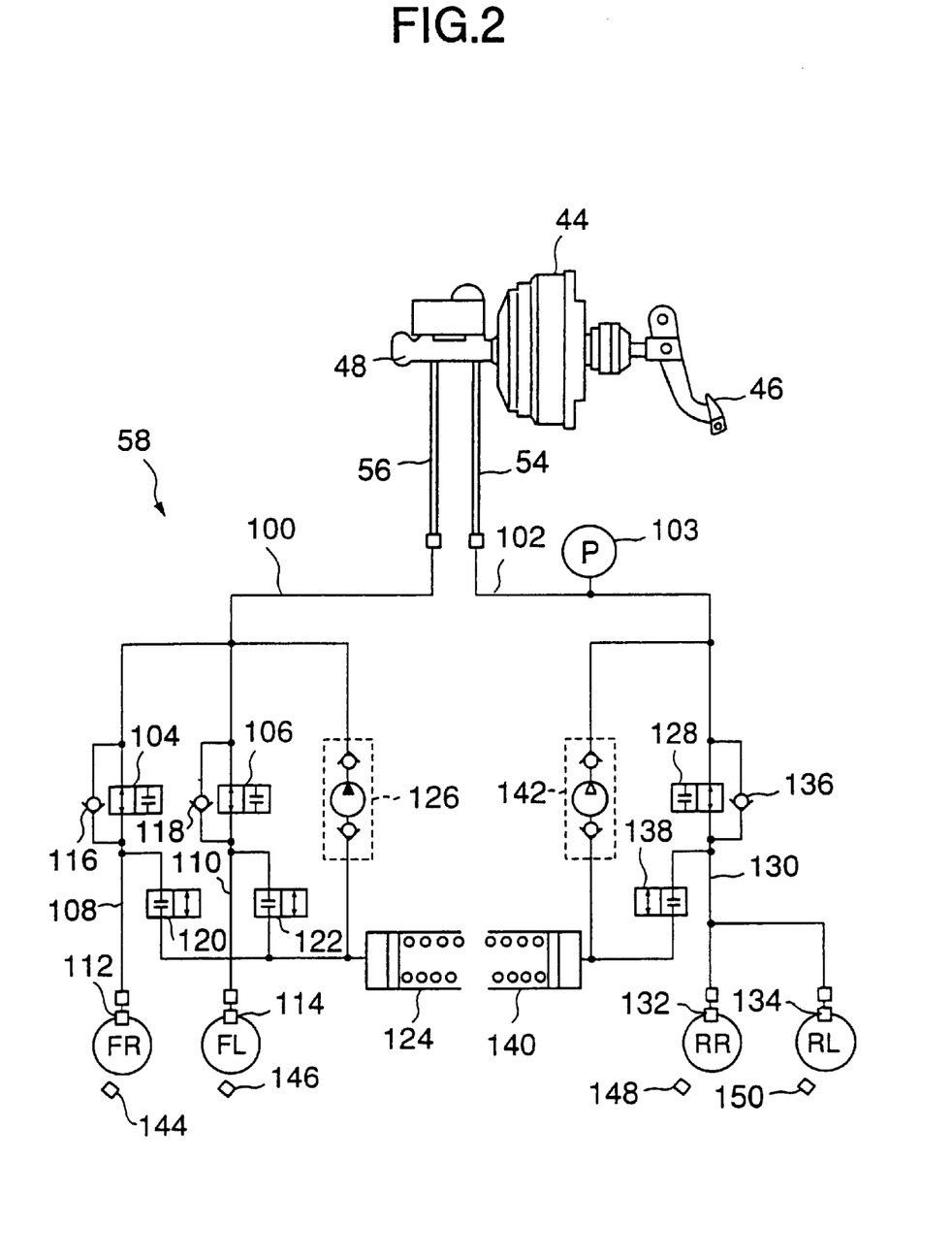
FIG. 2 is a diagram of hydraulic brake equipment provided in the brake system of FIG. 1.

FIG. 2 shows a configuration of the hydraulic brake equipment 58 in the brake system of the present embodiment. As shown in FIG. 2, the hydraulic brake equipment 58 includes a front-master passage 100 connected to the brake pipe 56 from the brake master cylinder 48, and a rear-master passage 102 connected to the brake pipe 54 from the brake master cylinder 48. A brake-master pressure sensor 103 is provided in the rear-master passage 102. The brake-master pressure sensor 103 is electrically connected to the brake ECU 60. The brake-master pressure sensor 103 outputs an electrical signal, indicative of the pressure of brake fluid in the rear-master passage 102 (which pressure is substantially equal to the master cylinder pressure Pmc of the brake master cylinder 48), to the brake ECU 60. The brake ECU 60 detects the master cylinder pressure Pmc based on the signal output by the brake-master pressure sensor 103.

In the hydraulic brake equipment 58 of FIG. 2, the front-master passage 100 is connected through a pressure-holding valve 104 to an FR (front-right) wheel brake passage 108, and it is also connected through a pressure-holding valve 106 to an FL (front-left) wheel brake passage 110. The wheel brake passage 108 is connected at its end to an FR wheel brake cylinder 112 that is provided on the FR wheel of the vehicle. The wheel brake passage 110 is connected at its end to an FL wheel brake cylinder 114 that is provided on the FL wheel of the vehicle.

The pressure-holding valves 104 and 106 are electrically connected to the brake ECU 60, and the ON/OFF states of each of the pressure-holding valves 104 and 106 are controlled by a control signal that is supplied by the brake ECU 60. Specifically, each of the pressure-holding valves 104 and 106 is a solenoid valve that is normally set in the valve-open position (or the OFF state) when no control signal is supplied from the brake ECU 60, and set in the valve-closed position (or the ON state) when the control signal is supplied from the brake ECU 60. A check valve 116 is provided in a bypass passage that is provided around the pressure-holding valve 104 and connected between the passage 100 and the passage 108. A check valve 118 is provided in a bypass passage that is provided around the pressure-holding valve 106 and connected between the passage 100 and the passage 110. Each of the check valves 116 and 118 is a one-way valve that allows the flow of the brake fluid within the bypass passage only in the direction from the wheel brake cylinder 112 or 114 to the brake master cylinder 48. When the brake fluid flows in the bypass passage from the wheel brake cylinder to the brake master cylinder 48, each of the check valves 116 and 118 allows such a flow of the brake fluid. Otherwise each of the check valves 116 and 118 serve to prevent the backward flow of the brake fluid in the bypass passage.

In the hydraulic brake equipment 58 of FIG. 2, the wheel brake passage 108 at a downstream position of the pressure-holding valve 104 is connected through a pressure-reducing valve 120 to a reservoir 124, and the wheel brake passage 110 at a downstream position of the pressure-holding valve 106 is connected through a pressure-reducing valve 122 to the reservoir 124. The pressure-reducing valves 120 and 122 are electrically connected to the brake ECU 60, and the ON/OFF states of each of the pressure-reducing valves 120 and 122 are controlled by a control signal that is supplied by the brake ECU 60. Specifically, each of the pressure-reducing valves 120 and 122 is a solenoid valve that is normally set in the valve-closed position (or the OFF state) when no control signal is supplied from the brake ECU 60, and set in the valve-open position (or the ON state) when the control signal is supplied from the brake ECU 60.

In the hydraulic brake equipment 58 of FIG. 2, a pump 126 is provided between the front-master passage 100 and the reservoir 124, and the pump 126 has an inlet portion connected to the reservoir 124 and an outlet portion connected to the front-master passage 100.

Further, in the hydraulic brake equipment 58 of FIG. 2, the rear-master passage 102 is connected through a pressure-holding valve 128 to a wheel brake passage 130. The wheel brake passage 130 is connected to both an RR (rear-right) wheel brake cylinder 132 that is provided on the RR wheel of the vehicle, and an RL (rear-left) wheel brake cylinder 134 that is provided on the RL wheel of the vehicle. The pressure-holding valve 128 is electrically connected to the brake ECU 60, and the ON/OFF states of the pressure-holding valve 128 are controlled by a control signal that is supplied by the brake ECU 60. Specifically, the pressure-holding valve 128 is a solenoid valve that is normally set in the valve-open position (or the OFF state) when no control signal is supplied from the brake ECU 60, and set in the valve-closed position (or the ON state) when the control signal is supplied from the brake ECU 60.

A check valve 136 is provided in a bypass passage that is provided around the pressure-holding valve 128 and connected between the passage 102 and the passage 130. The check valve 136 is a one-way valve that allows the flow of the brake fluid within the bypass passage only in the direction from the wheel brake cylinder 132 or 134 to the brake master cylinder 48. When the brake fluid flows in the bypass passage from the wheel brake cylinder to the brake master cylinder 48, the check valve 136 allows such a flow of the brake fluid. Otherwise the check valve 136 serves to prevent the backward flow of the brake fluid in the bypass passage.

In the hydraulic brake equipment 58 of FIG. 2, the wheel brake passage 130 at a downstream position of the pressure-holding valve 128 is connected through a pressure-reducing valve 138 to a reservoir 140. The pressure-reducing valve 138 is electrically connected to the brake ECU 60, and the ON/OFF states of the pressure-reducing valve 138 are controlled by a control signal that is supplied by the brake ECU 60. Specifically, the pressure-reducing valve 138 is a solenoid valve that is normally set in the valve-closed position (or the OFF state) when no control signal is supplied from the brake ECU 60, and set in the valve-open position (or the ON state) when the control signal is supplied from the brake ECU 60.

In the hydraulic brake equipment 58 of FIG. 2, a pump 142 is provided between the rear-master passage 102 and the reservoir 140, and the pump 142 has an inlet portion connected to the reservoir 140 and an outlet portion connected to the rear-master passage 102.

Further, in the hydraulic brake equipment 58 of FIG. 2, wheel speed sensors 144, 146, 148 and 150 are respectively provided in the vicinity of the FR, FL, RR and RL wheels of the vehicle. The wheel speed sensors 144, 146, 148 and 150 are electrically connected to the brake ECU 60. Each of the wheel speed sensors 144, 146, 148 and 150 outputs an electrical signal, indicative of the wheel speed (which will be called the wheel speed VW) of the related one of the four wheels of the vehicle, to the brake ECU 60. The brake ECU 60 detects the individual wheel speeds of the four wheels of the vehicle based on the signals supplied from the wheel speed sensors 144, 146, 148 and 150.

In the above-described brake system of the present embodiment, the brake ECU 60 controls the ON/OFF states of the respective solenoid valves in the hydraulic brake equipment 58, and the hydraulic brake equipment 58 can selectively perform one of a normal braking function and an ABS (antilock brake system) control function for the vehicle according to the instructions of the brake ECU 60.

When the normal braking function is executed by the hydraulic brake equipment 58, a braking force that is substantially proportional to the master cylinder pressure "Pmc" is exerted on the wheels of the vehicle. When the ABS control function is performed by the hydraulic brake equipment 58, the undesired locking of the wheels of the vehicle when an abrupt braking operation is performed by the vehicle operator can be appropriately prevented.

As shown in FIG. 2, in order to achieve the normal braking function of the hydraulic brake equipment 58, all of the solenoid valves in the hydraulic brake equipment 58 are set in the OFF state (or set in the valve-closed position) and the operations of the pumps 126 and 142 are stopped. This preliminary condition of the hydraulic brake equipment 58 is illustrated in FIG. 2. Hereinafter, the preliminary condition of the hydraulic brake equipment 58, shown in FIG. 2, will be called the normal braking configuration.

When the hydraulic brake equipment 58 is in the normal braking configuration (shown in FIG. 2), the FR and FL wheel brake cylinders 112 and 114 are connected to the brake master cylinder 48 through the wheel brake passages 108 and 110 and through the front-master passage 100. The RR and RL wheel brake cylinders 132 and 134 are connected to the brake master cylinder 48 through the wheel brake passage 130 and through the rear-master passage 102. Hence, in the normal braking configuration, the pressure of brake fluid in the wheel brake cylinders 112, 114, 132 and 134 (which will be collectively called the wheel cylinder pressure "Pwc") is controlled so as to be always equal to the master cylinder pressure "Pmc". Therefore, the braking force that is substantially proportional to the master cylinder pressure "Pmc" can be exerted on the wheels of the vehicle by the wheel brake cylinders 112, 114, 132 and 134.

On the other hand, when performing the ABS control function, the operations of the pumps 126 and 142 are started from the normal braking configuration of the hydraulic brake equipment 58 (shown in FIG. 2), and the pressure-holding valves 104, 106 and 128 and the pressure-reducing valves 120, 122 and 138 are suitably set in one of the ON state and the OFF state by detecting the slipping conditions of the respective wheels of the vehicle. Hereinafter, such a condition of the hydraulic brake equipment 58 (not shown in FIG. 2) will be called the ABS control configuration.

The brake ECU 60 starts execution of the ABS control function for the hydraulic brake equipment 58 when the brake pedal 46 is depressed and, at the same time, an excessive slipping ratio of any of the wheels of the vehicle is detected. During the execution of the ABS control function for the hydraulic brake equipment 58, the master cylinder pressure "Pmc" in the brake master cylinder 48, which is raised by the depression of the brake pedal 46, is introduced into both the front-master passage 100 and the rear-master passage 102. If the brake ECU 60 sets the pressure-holding valves 104, 106 and 128 in the ON state (or in the valve-open position) and sets the pressure-reducing valves 120, 122 and 138 in the OFF state (or in the valve-closed position) under such a condition of the hydraulic brake equipment 58, the wheel cylinder pressure "Pwc" of each of the wheel brake cylinders 112, 114, 132 and 134 can be increased to the master cylinder pressure "Pmc" of the brake master cylinder 48. Hereinafter, this control mode of the brake ECU 60 will be called the pressure increase mode.

Further, during the execution of the ABS control function, if the brake ECU 60 sets the pressure-holding valves 104, 106 and 128 in the OFF state (or in the valve-closed position) and sets the pressure-reducing valves 120, 122 and 138 in the OFF state (or in the valve-closed position), the wheel cylinder pressure "Pwc" of each of the wheel brake cylinders 112, 114, 132 and 134 can be maintained at the current level. Hereinafter, this control mode of the brake ECU 60 will be called the pressure hold mode.

Further, during the execution of the ABS control function, if the brake ECU 60 sets the pressure-holding valves 104, 106 and 128 in the OFF state (or in the valve-closed position) and sets the pressure-reducing valves 120, 122 and 138 in the ON state (or in the valve-open position), the wheel cylinder pressure "Pwc" of each of the wheel brake cylinders 112, 114, 132 and 134 can be decreased. The brake fluid retained in the wheel brake cylinders 112 and 114 is returned to the reservoir 124 via the pressure-reducing valves 120 and 122. The brake fluid retained in the wheel brake cylinders 132 and 134 is returned to the reservoir 140 via the pressure-reducing valve 138. Hereinafter, this control mode of the brake ECU 60 will be called the pressure reduce mode.

During the execution of the ABS control function, the brake ECU 60 appropriately carries out one of the pressure increase mode, the pressure hold mode and the pressure reduce mode for the hydraulic brake equipment 58 in response to the slipping conditions of the respective wheels of the vehicle. That is, the brake ECU 60 controls the ON/OFF states of the relevant solenoid valves in the hydraulic brake equipment 58 by detecting the slipping conditions of the respective wheels of the vehicle. In this manner, the brake ECU 60 carries out the ABS control function such that the wheel cylinder pressure "Pwc" of each of the wheel brake cylinders 112, 114, 132 and 134 does not produce an excessive slipping ratio of the corresponding wheel.

When performing the pressure reduce mode during the ABS control, the brake fluid retained in the wheel brake cylinders 112, 114, 132 and 134 is returned to the reservoirs 124 and 140. The flow of the brake fluid in the hydraulic brake equipment 58 at that time causes the brake pedal stroke to be increased. When performing the pressure increase mode during the ABS control, the pumps 126 and 142 supply the brake fluid from the reservoirs 124 and 140 to the brake master cylinder 48 via the front-master and rear-master passages 100 and 102. The flow of the brake fluid in the hydraulic brake equipment 58 at this time causes the brake pedal stroke to be decreased. As the pressure increase mode and the pressure reduce mode are repeated during the execution of the ABS control function, the brake pedal vibrations will take place. As previously described, it is difficult for a conventional brake booster pressure control apparatus to provide adequate brake booster pressure for the energy consumption of the brake booster, which is increased during the execution of the ABS control or upon occurrence of the brake pedal vibrations.

The brake booster pressure control apparatus of the present embodiment is configured to effectively provide adequate brake booster pressure for the energy consumption that is increased when the brake pedal vibrations take place.

Figure 3:
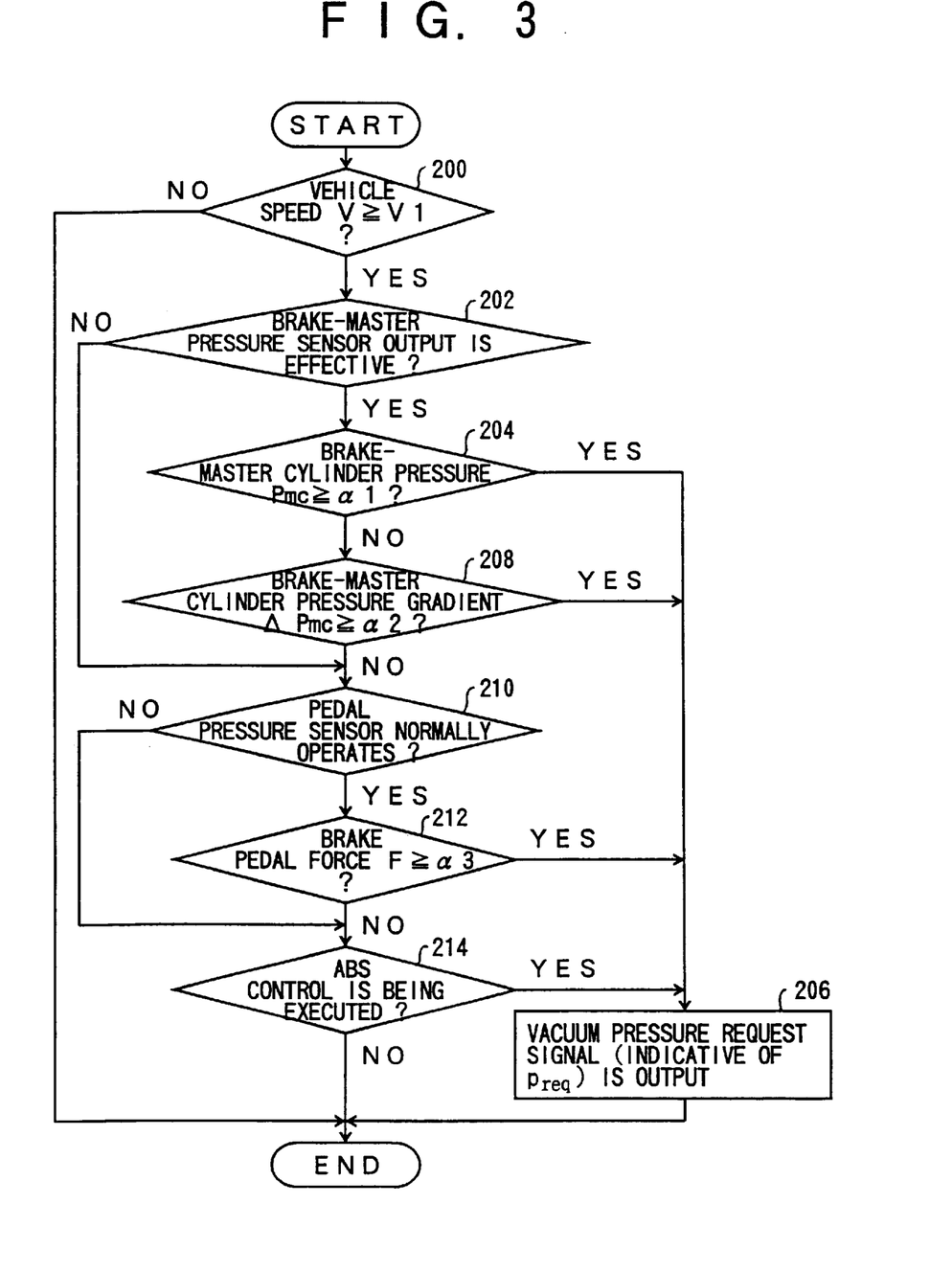
FIG. 3 is a flowchart for explaining a brake-pedal vibration detecting routine executed by a brake ECU in the brake system of FIG. 1.

Next, FIG. 3 shows a brake-pedal vibration detecting routine executed by the brake ECU 60 in the brake system of the present embodiment. The brake ECU 60 repeats the execution of the brake-pedal vibration detecting routine of FIG. 3 at predetermined time intervals.

As shown in FIG. 3, at a start of the brake-pedal vibration detecting routine, the ECU 60 in step 200 determines whether the vehicle speed V, which is detected based on the signals supplied from the wheel speed sensors 144, 146, 148 and 150, exceeds a given reference speed V1 (V≧V1).

Figure 4:
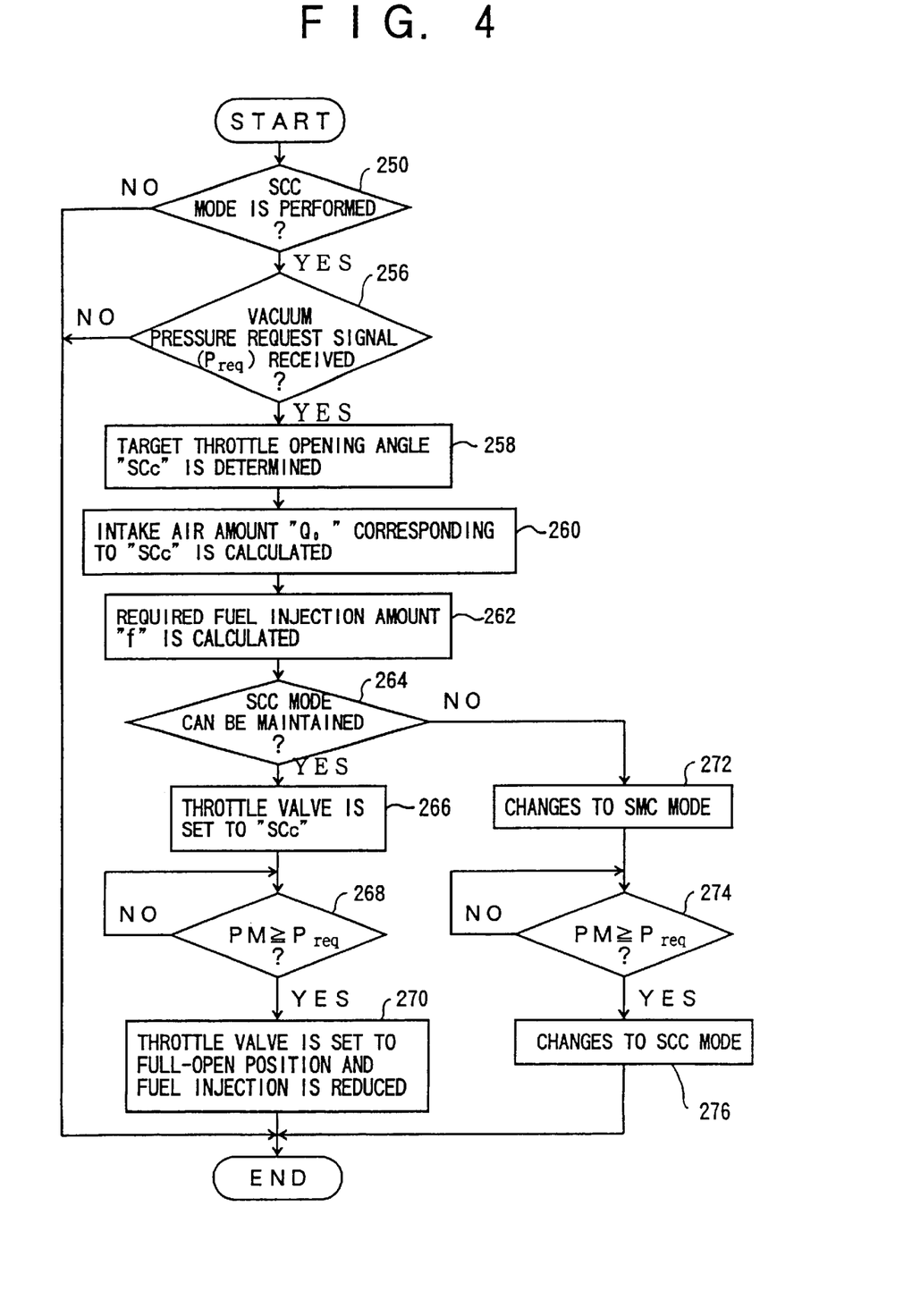
FIG. 4 is a flowchart for explaining a brake-booster pressure control routine executed by an engine ECU in the brake system of FIG. 1.

When the result at the step 200 is negative (V<V1), the energy consumption of the brake booster 44 prior to the stop of the vehicle will be small, and it is determined that the execution of the brake booster pressure control is currently not needed. The subsequent steps in the routine of FIG. 3 are not performed, and the brake-pedal vibration detecting routine at this cycle is terminated. According to the step 200 in the present embodiment, the brake booster pressure control routine, which is described with FIG. 4, is not performed when the vehicle speed V is below the reference speed V1. The worsening of the fuel economy during the low-load operation of the vehicle can be prevented.

When the result at the step 200 is affirmative (V≧V1), the brake ECU 60 in step 202 determines whether the output signal of the brake-master pressure sensor 103 is effective; that is, the brake ECU 60 on the required occasions detects whether the signal output by the brake-master pressure sensor 103 indicates the master cylinder pressure Pmc that is suited for the brake pedal force F on the brake pedal 46. The determination as to whether the output signal of the brake-master pressure sensor 103 is effective can be made based on such detections by the brake ECU 60 on the required occasions.

When the result at the step 202 is affirmative, the output signal of the brake-master pressure sensor 103 is effective. The brake ECU 60 in step 204 determines whether the master cylinder pressure Pmc, which is detected based on the signal output by the brake-master pressure sensor 103, exceeds a predetermined threshold value α1. When the result at the step 204 is affirmative (Pmc≧α1), the braking force requested by the vehicle operator is considerably large, and the energy consumption of the brake booster 44 will be considerably increased. It is determined in this condition that the brake booster pressure control should be carried out.

The brake ECU 60 executes step 206, which will be described later.

When the result at the step 204 is negative (Pmc<α1), the brake ECU 60 in step 208 determines whether a gradient ΔPmc of the master cylinder pressure Pmc (ΔPmc=dPmc/dt) with respect to the elapsed time, which gradient is calculated based on the signal output by the brake-master pressure sensor 103, exceeds a predetermined threshold value α2. When the result at the step 208 is affirmative (ΔPmc≧α2), the braking force requested by the vehicle operator is considerably large, and the energy consumption of the brake booster 44 will be considerably increased. It is determined in this condition that the brake booster pressure control should be carried out. The brake ECU 60 executes the step 206, which will be described later.

In the above-described embodiment, the necessity of the execution of the brake booster pressure control is determined at the step 204 or 208 based on the results of the comparison between the brake-master-cylinder pressure (or its gradient) and the predetermined threshold value. Alternatively, the necessity of the execution of the brake booster pressure control may be determined based on the results of the comparison between the brake pedal stroke (or its gradient) and the predetermined threshold value. The brake pedal stroke and its gradient can be detected based on the signal output by the brake pedal stroke sensor 64.

When the result at the step 208 is negative (ΔPmc<α2) or when the result at the step 202 is negative, the brake ECU 60 in step 210 determines whether the brake pedal pressure sensor 62 is normally operating. During an initial checking of the hydraulic brake equipment 58, the brake ECU 60 detects whether a malfunction in the brake pedal pressure sensor 62 has taken place. The determination as to whether the brake pedal pressure sensor 62 is normally operating can be made based on the result of the initial checking by the brake ECU 60.

When the result at the step 210 is affirmative, the brake ECU 60 in step 212 determines whether the brake pedal force F, which is detected based on the signal output by the brake pedal pressure sensor 62, exceeds a predetermined threshold value α3. When the result at the step 212 is affirmative (F≧α3), the braking force requested by the vehicle operator is considerably large, and the energy consumption of the brake booster 44 will be considerably increased. It is determined in this condition that the brake booster pressure control should be carried out. The brake ECU 60 performs the step 206, which will be described later.

In the above-described embodiment, the necessity of the execution of the brake booster pressure control is determined at the step 212 based on the result of the comparison between the brake pedal force F and the predetermined threshold value. Alternatively, the necessity of the execution of the brake booster pressure control may be determined based on the result of the comparison between the brake pedal force gradient (dF/dt) and a predetermined threshold value. The brake pedal force gradient with respect to the elapsed time can be calculated based on the signals output by the brake pedal pressure sensor 62.

When the result at the step 210 is negative, or when the result at the step 212 is negative, the brake ECU 60 in step 214 determines whether the brake ECU 60 is executing the ABS control function. When the result at the step 214 is affirmative, the brake pedal vibrations will take place, and it is determined in this condition that the energy consumption of the brake booster 44 will be considerably increased. The brake ECU 60 performs the step 206, which will be described later.

As mentioned above, when it is determined in the above steps that the energy consumption of the brake booster 44 will be considerably increased, the brake ECU 60 in the step 206 transmits a vacuum pressure request signal, which is indicative of the required vacuum pressure "Preq" for the brake booster 44, to the engine ECU 12. Therefore, the vacuum pressure request signal, which is output by the brake ECU 60 in the step 206, is indicative of occurrence of the brake pedal vibrations. After the step 206 is performed, the brake-pedal vibration detecting routine at this cycle is terminated.

In the above-described embodiment, the required vacuum pressure Preq, which is indicated by the vacuum pressure request signal output by the brake ECU 60 at the step 206, may be set to either a fixed value or a variable value. If the required vacuum pressure Preq is set to a variable value, the variable value that is proportional to the magnitude of the detected vehicle speed V, the detected master cylinder pressure Pmc, the detected brake-pedal force F or the detected brake-pedal stroke, can be selected.

When the result at the step 214 is negative, the step 206 is not performed, and the brake-pedal vibration detecting routine at this cycle is terminated. In this condition, no vacuum pressure request signal is output by the brake ECU 60.

In the hydraulic brake equipment 58 of FIG. 2, there may be the case in which the ABS control function is performed in the pressure reducing mode with the operation of the pumps 126 and 142 stopped. In this case, the energy consumption of the brake booster 44 will not considerably be increased even during the execution of the ABS control function. Therefore, when it is detected at the step 214 that the operation of the pumps 126 and 142 is stopped but the ABS control is being executed, it is necessary that the brake ECU 60 does not transmit the vacuum pressure request signal to the engine ECU 12.

In the above-described embodiment, the threshold values α1, α2 and α3, which are used in the steps 204, 208 and 212, respectively, may be changed in proportion with the value of the detected vehicle speed V. The larger the vehicle speed V, the larger the energy consumption of the brake booster 44 prior to the stop of the vehicle. Hence, it is preferred to decrease the threshold values in proportion with the value of the detected vehicle speed V and to frequently perform the brake booster pressure control. The brake booster pressure control apparatus of the present embodiment is effective in providing adequate brake booster pressure for the energy consumption that is increased when the brake pedal vibrations take place.

Next, FIG. 4 shows a brake-booster pressure control routine executed by the engine ECU 12 in the brake system of the present embodiment. The engine ECU 12 repeats the execution of the brake booster pressure control routine of FIG. 4 at predetermined time intervals.

As shown in FIG. 4, at a start of the brake-booster pressure control routine, the ECU 12 in step 250 determines whether the engine 10 is running in the SCC mode. When the result at step 250 is negative, the engine 10 is running in the SMC mode. It is determined in this case that the brake-booster pressure control cannot be carried out without lowering the engine output. The ECU 12 does not perform the subsequent steps, and the control routine at this cycle is terminated.

When the result at step 250 is affirmative, the engine 10 is running in the SCC mode. The ECU 12 in step 256 determines whether the vacuum pressure request signal from the brake ECU 60 is received. When the result at step 256 is negative, the vacuum pressure request signal is not transmitted from the brake ECU 60 to the engine ECU 12. The ECU 12 does not perform the subsequent steps, and the control routine at this cycle is terminated.

When the result at step 256 is affirmative, the vacuum pressure request signal from the brake ECU 60 is received, and the required brake booster pressure Preq, which is indicated by the vacuum pressure request signal, is obtained by the ECU 12. The ECU 12 in step 258 determines a target throttle opening angle "SCc" for the throttle valve 34 that makes the intake air pressure PM equal to the required brake booster pressure Preq. Generally, the larger the intake air amount Q, the smaller the intake air pressure PM. The larger the engine speed Ne, the larger the intake air pressure PM. The intake air amount Q of the intake pipe 32 is substantially proportional to the throttle opening angle SC of the throttle valve 34. In step 258, the ECU 12 determines the target throttle opening angle SCc based on both the detected engine speed Ne from the engine speed sensor 68 and the required brake booster pressure Preq from the brake ECU 60. As the vacuum pressure request signal is sent by the brake ECU 60, the target throttle opening angle SCc, determined in step 258, is normally smaller than the current throttle opening angle of the throttle valve 34.

After the target throttle opening angle SCc is determined in step 258, the ECU 12 in step 260 calculates an estimated intake air amount "Qo" corresponding to the target throttle opening angle SCc.

After the estimated intake air amount Qo is calculated in step 260, the ECU 12 in step 262 calculates a required fuel injection f for the fuel injection valve 20 that corresponds to the accelerator pedal opening angle AC, requested by the vehicle operator, when the engine 10 is running in the SCC mode. If the throttle valve 34 is set to the target throttle opening angle SCc by the control signal from the ECU 12, some pumping loss of the engine 10 will take place. An additional fuel injection is needed for the engine 10 to compensate for the pumping loss, and the required fuel injection f is calculated by the ECU 12 in step 262 by taking account of the additional fuel injection.

After the required fuel injection f is calculated in step 262, the ECU 12 in step 264 determines whether the SCC mode operation of the engine 10 can be maintained at the current engine speed Ne with the estimated intake air amount Qo and the required fuel injection f.

When the result at the step 264 is affirmative, it is determined that the SCC mode operation of the engine 10 can be maintained after the throttle valve 34 is set to the target throttle opening angle SCc. The ECU 12 in step 266 supplies the control signal to the throttle motor 36 so as to set the throttle valve 34 to the target throttle opening angle SCc.

After the throttle valve 34 is set to the target throttle opening angle SCc in step 266, the SCC mode operation of the engine 10 is maintained and the intake air pressure PM of the intake pipe 32 will be increased to the required brake booster pressure Preq. The ECU 12 in step 268 determines whether the detected intake air pressure PM, which is supplied from the intake air pressure sensor 40, has reached the required brake booster pressure Preq (PM≧Preq).

When the result at the step 268 is negative, the detected intake air pressure PM has not yet reached the required brake booster pressure Preq. The ECU 12 repeats the determination of the step 268 until the above-mentioned condition is met.

When the result at the step 268 is affirmative, the detected intake air pressure PM has reached the required brake booster pressure Preq. The ECU 12 in step 270 outputs the control signal to the throttle motor 36 so as to set the throttle valve 34 to the full-open position, and outputs the control signal to the fuel injection valve 20 so as to reduce the fuel injection to such an extent that the additional fuel injection for the pumping loss is canceled. After the step 270 is performed, the control routine at this cycle is terminated.

On the other hand, when the result at the step 264 is negative, it is determined that the SCC mode operation of the engine 10 cannot be maintained if the throttle valve 34 is set to the target throttle opening angle SCc. The ECU 12 in step 272 transfers the operation mode of the engine 10 from the SCC mode to the SMC mode.

When the engine 10 is running in the SMC mode, the throttle opening angle SC of the throttle valve 34 is controlled in response to the accelerator pedal opening angle AC, which is supplied from the accelerator position sensor 72. Generally, the intake air pressure PM generated in the SMC mode for an accelerator pedal opening angle AC is larger than a corresponding intake air pressure PM generated in the SCC mode for the same accelerator pedal opening angle AC. After the step 272 is performed, the engine 10 is running in the SMC mode, and the intake air pressure PM will be increased. The ECU 12 in step 274 determines whether the detected intake air pressure PM has reached the required brake booster pressure Preq (PM≧Preq).

When the result at the step 274 is negative, the detected intake air pressure PM has not yet reached the required brake booster pressure Preq. The ECU 12 repeats the determination of the step 274 until the above-mentioned condition is met.

When the result at the step 274 is affirmative, the detected intake air pressure PM has reached the required brake booster pressure Preq. The ECU 12 in step 276 transfers the operation mode of the engine 10 from the SMC mode to the SCC mode. After the step 276 is performed, the control routine at this cycle is terminated.

According to the above-described embodiment, the brake-booster pressure control routine is carried out during the execution of the ABS control wherein the energy consumption of the brake booster is increased due to the brake pedal vibrations. Therefore, the brake booster pressure control apparatus of the above-described embodiment is effective in providing adequate brake booster pressure for the increased energy consumption as in the conventional brake booster pressure control apparatus.

According to the brake-pedal vibration detecting routine of FIG. 3, the brake ECU 60 determines whether the brake pedal vibrations take place in the brake system under the particular conditions, such as those during the execution of the ABS control, and outputs a vacuum pressure request signal that is indicative of occurrence of the brake pedal vibrations. If the engine ECU 12 receives the vacuum pressure request signal supplied from the brake ECU 60, the engine ECU 12 controls the brake booster pressure based on the received vacuum pressure request signal by executing the brake-booster pressure control routine of FIG. 4. Therefore, the brake booster pressure control apparatus of the above-described embodiment is effective in providing adequate brake booster pressure for the increased energy consumption.

According to the brake-pedal vibration detecting routine of FIG. 3, the brake ECU 60 does not output the vacuum pressure request signal when the energy consumption of the brake booster is not large enough to request the brake booster pressure control. Therefore, the brake booster pressure control apparatus of the above-described embodiment is effective in avoiding the execution of the brake booster pressure control routine when it is unnecessary. This makes it possible to minimize the worsening of the fuel economy due to the execution of the brake booster pressure control routine.

Further, in the brake-pedal vibration detecting routine of FIG. 3, the determination as to whether the brake pedal vibrations take place in the brake system is made without using the output signal of the brake booster pressure sensor 52. According to the above-described embodiment, the engine ECU 12 can start the execution of the brake booster pressure control at an appropriate time even when the brake booster pressure sensor 52 malfunctions. Therefore, the brake booster pressure control apparatus of the above-described embodiment is effective in providing an adequate brake booster pressure for the increased energy consumption due to the brake pedal vibrations.

In the above-described embodiment, the determination as to whether the brake pedal vibrations take place is made based on the output signal of the brake-pedal pressure sensor 62 (see the steps 210 and 212 in FIG. 3). However, the present invention is not limited to this embodiment. Alternatively, the above-mentioned determination may be made based on the output signal of the brake-pedal stroke sensor 64. In the alternative embodiment, the brake ECU 60 outputs the vacuum pressure request signal when the brake-pedal stroke detected with the stroke sensor 64 is larger than a given threshold valve. Further, in the alternative embodiment, it is possible that the required brake booster pressure Preq be set as a variable pressure that is proportional to the magnitude of the detected brake-pedal stroke.

In the above-described embodiment, the execution of the brake booster pressure control is allowed out only when the engine 10 is running in the SCC mode (see the step 250 in FIG. 4). However, the present invention is not limited to this embodiment. When the brake booster pressure control apparatus of the present invention is applied to an internal combustion engine of the type that is designed to work well in the SMC mode, the execution of the brake booster pressure control may be allowed when the engine is running in the SMC mode but the increase of the brake booster pressure is needed.

The present invention is not limited to the above-described embodiments, and variations and modifications may be made without departing from the scope of the present invention.

What is claimed is:

1. A brake booster pressure control apparatus for controlling a pressure of a brake booster, the brake booster assisting a braking operation on a brake pedal by using an intake air pressure, said apparatus comprising:

a brake-pedal vibration detecting unit which detects vibrations of the brake pedal, and outputs a vacuum request signal indicative of occurrence of the vibrations of the brake pedal; and a pressure control unit which controls the pressure of the brake booster based on the vacuum request signal output by the brake-pedal vibration detecting unit.

2. The brake booster pressure control apparatus according to claim 1, wherein said brake booster pressure control apparatus is provided in an automotive vehicle that is capable of executing an ABS control, and the brake-pedal vibration detecting unit determines whether the ABS control is being executed, the brake-pedal vibration detecting unit outputting the vacuum request signal based on a result of the determination as to the execution of the ABS control.

3. The brake booster pressure control apparatus according to claim 1, wherein the vacuum request signal output by said brake-pedal vibration detecting unit is indicative of a required brake booster pressure.

4. The brake booster pressure control apparatus according to claim 1, wherein said pressure control unit includes a determination unit which determines whether a detected intake air pressure exceeds a required brake booster pressure indicated by the vacuum request signal output by said brake-pedal vibration detecting unit.

5. The brake booster pressure control apparatus according to claim 1, wherein said brake-pedal vibration detecting unit includes a determination unit which determines, prior to the outputting of said signal, whether a detected brake-master-cylinder pressure exceeds a predetermined threshold value.

6. The brake booster pressure control apparatus according to claim 1, wherein said brake-pedal vibration detecting unit includes a determination unit which determines, prior to the outputting of the vacuum request signal, whether a calculated brake-master-cylinder pressure gradient exceeds a predetermined threshold value.

7. The brake booster pressure control apparatus according to claim 1, wherein said brake-pedal vibration detecting unit includes a determination unit which determines, prior to the outputting of the vacuum request signal, whether a calculated brake-pedal force exceeds a predetermined threshold value.

8. The brake booster pressure control apparatus according to claim 1, wherein said brake-pedal vibration detecting unit includes a determination unit which determines, prior to the outputting of the vacuum request signal, whether a detected brake-pedal stroke exceeds a predetermined threshold value.

9. The brake booster pressure control apparatus according to claim 1, wherein said brake-pedal vibration detecting unit is provided in a first electronic control unit that controls hydraulic brake equipment, and said pressure control unit is provided in a second electronic control unit that controls an engine.

10. The brake booster pressure control apparatus according to claim 1, wherein said brake booster pressure control apparatus is provided in an automotive vehicle that is equipped with an internal combustion engine, said engine being capable of performing in a stratified charge combustion mode and a stoichiometric combustion mode.

* * * * *